United States Patent [19]
Vogel et al.

[11] Patent Number: 6,055,663
[45] Date of Patent: Apr. 25, 2000

[54] ERROR-ROBUST MULTIPLEX PROCESS WITH HEADER CONTROL FIELD

[75] Inventors: Peter Vogel; Joachim Wolf, both of Hildesheim; Dirk Lappe, Schellerten/Dinklar; Rodolfo Mann Pelz, Hannover; Gunnar Nitsche, Hildesheim, all of Germany

[73] Assignee: Robert Bosch GmbH, Stuttgart, Germany

[21] Appl. No.: 08/843,377

[22] Filed: Apr. 15, 1997

[30] Foreign Application Priority Data

Apr. 15, 1996 [DE] Germany .............................. 196 14 739

[51] Int. Cl.[7] .............................. G06F 11/10; H03M 13/00
[52] U.S. Cl. .............................................. 714/752; 714/746
[58] Field of Search ..................... 371/37.01, 30, 371/42; 348/495; 714/752, 746, 775

[56] References Cited

U.S. PATENT DOCUMENTS 5,602,595 2/1997 Citta et al. .............................. 348/495

FOREIGN PATENT DOCUMENTS

3032296C2 2/1982 Germany .
196 14 739 4/1996 Germany .

OTHER PUBLICATIONS

Itt Study Group 15 ITU–T Recommended H.22P, Oct. 1995.

*Primary Examiner*—Phung M. Chung
*Attorney, Agent, or Firm*—Michael J. STriker

[57] ABSTRACT

The process for data transmission between two stations by means of data blocks each having a synchronization pattern field (SYNC), a header field (HEADER) and an information field (INFORMATION) following the header field includes providing a header control field (HEX) following the header field (HEADER) in each of the data blocks for reconstruction of the header field when a transmission of the header field contains errors.

23 Claims, 2 Drawing Sheets

| SYNC | HEADER | HEX | INFORMATION |
|------|--------|-----|-------------|

ERROR-ROBUST MULTIPLEX PROCESS WITH HEADER CONTROL FIELD

BACKGROUND OF THE INVENTION

The present invention relates to a process for transmission of data blocks between two stations in which each of the data blocks has a synchronization pattern field, SYNC, signaling the beginning of the data block, a header field, HEADER, and an information field, INFORMATION, following the header field and the header field includes control characters for processing the following INFORMATION field.

A process for transmission of data blocks, protocol H.22P (ITU-T Study Group 15, LBC 95-276, "ITU-T Recommendation H.22P") is already known in the art.

In this protocol the structure, the formats of the data and the control field and structure for the data to be transmitted by the multiplexer, establish the multiplex process protocol. The multiplex protocol facilitates the processing of logical information, which arrives in the multiplex level via the adaptation level, into uniform data units. The protocol allows the transmission of arbitrary combinations of digital, audio and video data or other information under data control and provides a special protocol for prevention of data loss, which has a synchronization pattern of 31 bits in length. The HEADER field (31 to 63 bits) and the INFORMATION field of fixed length are placed after it. The synchronization pattern must be detected by a correlation condition in a receiver so that the processing of the data blocks in the receiver can begin.

In this process data loss can occur by loss of synchronization. Also an error-containing header field, HEADER, cannot be reconstructed.

SUMMARY OF THE INVENTION

It is an object of the present invention to provide an improved error-robust multiplex process, which reduces or eliminates the above-described disadvantages.

This object, and others which will be made more apparent hereinafter, are attained in a process for data transmission between two stations by means of data blocks each having a synchronization pattern field, a header field and an information field, in which the synchronization pattern field indicates a beginning of one data block and the header field contains control characters for processing the information field following the header field.

The process according to the invention comprises the step of providing a header control field, HEX, following the header for reconstructing a header transmitted containing an error.

The process according to the invention has the advantage that it is possible to reconstruct the data in the case of an error containing transmission of the header field, HEADER, using the header control field, HEX.

Advantageous additional features and improvements of the above-described inventive process are provided in the dependent claims appended hereinbelow.

It is particularly advantageous when the header control field, HEX, includes an arbitrary number of bits, which can retain the information regarding possible changes in the header field, HEADER.

This information can be a simple resetting of the count in the header control field, HEX, to zero.

If one uses groups of data blocks with identical header fields and fixed length, the count remains constant and the indicator is reset to zero for a header change.

In a preferred embodiment of the invention an incrementing or decrementing of a count in the header control field, HEX, is required to indicate a change in the type of data block. Alternatively, it is advantageous to increment the count within one type of data block and to set it to zero to indicate a change in the header field.

In many embodiments it is advantageous if a header field change is indicated by decrementing the count in the header control field from a maximum value to zero.

An additional type of header field change is selected by feeding back a signal indicating reception. The other signal is advantageously reset after waiting for the signal indicating reception.

However a minimum time interval is expected prior to resetting with known signal on-times.

For a reduction of errors the header field, HEADER, can be distributed over the types of packets.

It is also advantageous when the header field, HEADER, and the header control field, HEX, are jointly advantageously protected. An advantageous error-protection method uses Reed-Solomon Codes.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
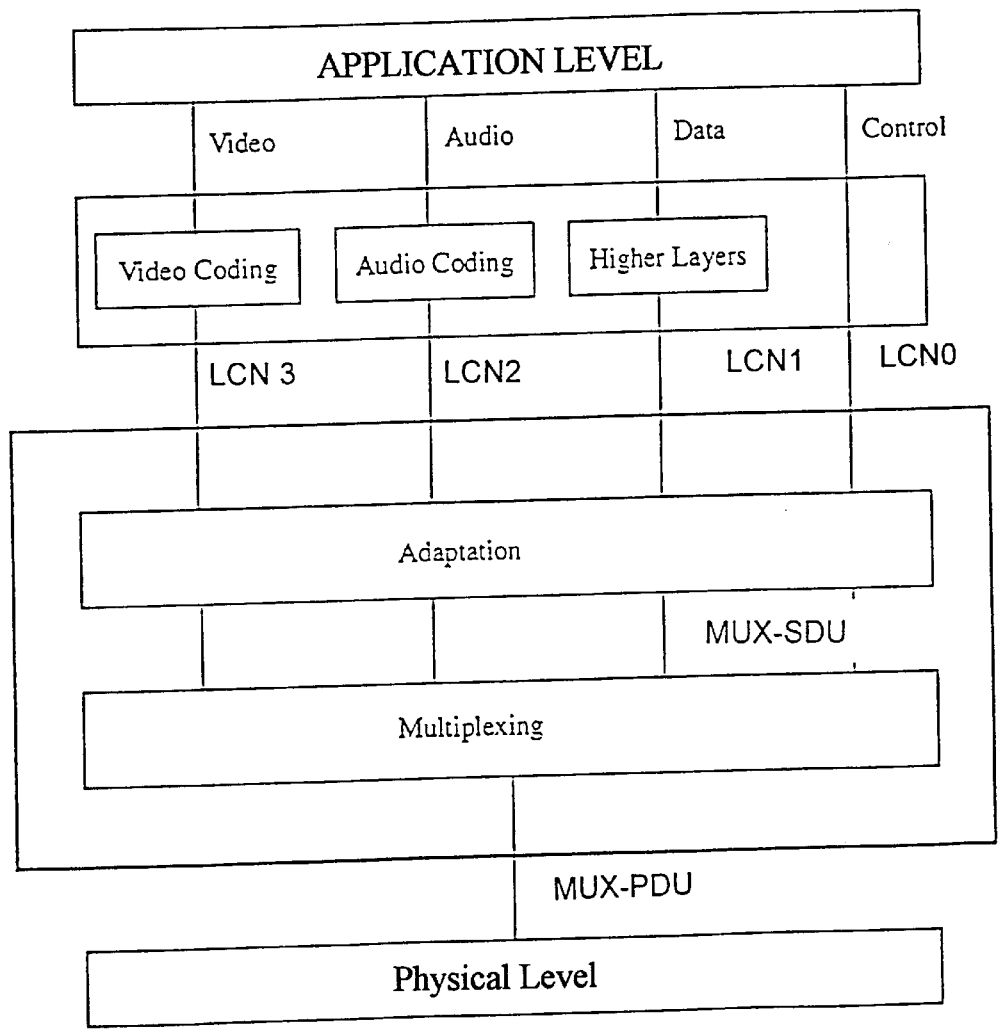
FIG. 1 is a diagram of the structure of the process of multiplex data transmission.

The data transmission of arbitrary data signals occurs via the hierarchically organized levels according to FIG. 1. The analog signals in part come from the individual data units to the coding level via the application level. After a digitalization step the contents of the logical channels LCN are further sent to the adaptation level of the multiplexer. The data reaches the multiplex level as MUX-SDU (Service Data Units) still in the separate channels. These levels combine the plurality of channels from the different data sources into a single channel and provide MUX-PDUs (Protocol Data Units). These data packets are filled with signals from the different sources according to the protocol of the invention.

Figure 2:
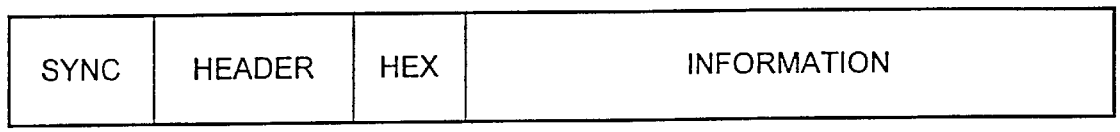
FIG. 2 is a diagram showing the structure of the data unit of the multiplex protocol.

FIG. 2 shows the sequence of the control and data fields in one such MUX-PDU. The first field SYNC contains a synchronization word or pattern of variable length, which contains a bit sequence to be detected, e.g. of 31 bits. The synchronization pattern is placed at the beginning of each data block in the synchronization pattern field, SYNC. For example, a Barker sequence or Williard sequence can be used as the synchronization pattern.

In the header field, HEADER, a transmission scheme for the information block following the RET field is provided. One example of one such transmission scheme is described in the Protocol H.233 (ITU-T Study Group 15). One such HEADER field has, e.g., 4 bits. All 16 states which the HEADER can be described with the 4 bits are tabulated in a table. If one, for example, only transmits audio signals, a certain bit sequence is set up, the information block for audio signals and video signals is divided and another bit sequence is sent.

The information field, INFORMATION, follows the other fields. It is structured according to the control devices set up in the HEADER field for the different data sources. The information field is filled with data according to the multiplex scheme provided in the HEADER field until the packet length n is reached.

A connection must be made as the first step for a data transmission. Moreover the length n of the data block is set up with the help of a control protocol. The length n is set up for the receiver and transmitter, also at a later point in time. Furthermore the control protocol must act during the transmission and make a comparison.

Since the structural length n of the data blocks can be maintained constant by a time interval established in the control protocol, the following synchronization strategy may be used: to begin the transmission the receiver seeks the synchronization pattern. The synchronization pattern must only select at the suitable positions along the length n and must be tested. It is of advantage to use a shorter length for n at the beginning of the transmission (connection made with the help of a control protocol) during making the connection and at the synchronization start. A time point is established at which the length n is changed with the help of the control protocol.

For detection of the SYNC on the receiver end of the data transmission in the demultiplexer a minimum number of bits is defined, which must agree between a pattern in the data flow and the synchronization pattern set up by the control protocol. If this minimum correlation condition is attained (correlation condition), the synchronization pattern has been found. In case a synchronization pattern has been found, an error detection process takes place for the HEADER. A successful structuring of the synchronization only occurs in the receiver, when an error-free HEADER was found at the synchronization pattern. An error detection can be a parity check in the simplest case, however it is advantageously performed with a CRC code. If an error is discovered during transmission of the data, the synchronization process is continued with the search for the next synchronization pattern. In this example the SYNC and the associated error-free HEADER must be found once in order to bring about the start-synchronization.

When the start-synchronization process is performed successfully, the next synchronization pattern is sought at times after a complete loop of length n. At the same time a counter is incremented, when the synchronization pattern does not fulfill the correlation condition and the HEADER cannot be detected error-free. When the counter has exceeded a certain limiting value G2 (a whole number value, which is established by the control protocol), the synchronization must be considered as lost and according to the above-described scheme must be synchronized. Typically the synchronization is considered lost after four attempts and a new start-synchronization follows.

If the synchronization is successfully completed during reception, the processing of the header field, HEADER; the header control field, HEX; and the information field, INFORMATION begins.

The header control field, HEX, includes z bits, which are used as a count (0 to $2^{z-1}$). First the count is set to 0. If a multiplex packet is transmitted with the same header field, HEADER, as the previous packet, the count in the header field HEX is incremented. If the count already has reached the value $2^{z-1}$, the counter state is retained. If the header field changes, count is again set to 0. If the header field, HEADER, contains errors, the associated multiplex packet is not further processed. A later correction process is possible with the help of the count. If a valid header field, HEADER, with associated header control field HEX is present in a following packet, the previous header field can be inferred with the aid of the count in the header control field, HEX ("Backwards detection"). This situation can be illustrated by example. Three received multiplex packets are considered. Packet 2 may be received with an error-containing header and is thus temporarily retained in memory. If the count HEX 3 in packet 3 is larger or equal to 1, thus the previously supplied packet 2 may be processed with the header field from packet 3. If the count HEX 3 is in contrast 0, thus the header field for packet 3 is not identical with the error-containing header field for packet 2. Thus it is better to process the packet 2 in temporary memory with the header from packet 1.

Thus it is of course uncertain whether the correct header field was used, however usually it is advantageous to process the data in the packet with an incorrect header rather than not process the multiplex packet.

Additional embodiments are described in the following paragraphs.

An additional use of the header control field (HEX) presupposes that a minimum number of successive multiplex packets with the same header field are assembled for transmission in the transmitter, e.g. with the aid of a control protocol, before the header field changes. Thus the process can be made more error-robust. Accordingly then a common group of m packets would then be provided (with identical header field, HEADER). For example in the three data packets with HEX 3=0 and m>1, it would be clear that the HEADER 2 must be identical with HEADER 1. In case of a common HEADER group one could modify the ways of counting in the header control field also in the following way:

a) the count in the header control field, HEX, for the header field, HEADER, is identical with the count in the same group of data blocks with equal header fields. Then at the beginning of a new group the count according to the above-described scheme or rules is incremented and/or set to 0; and b) in each group the header control field HEX is set equal to 0 in the first packet or data block and subsequently incremented for every other data block in the group.

The further transmission to the decoder of the data sources is delayed by the intervening storing of a packet or data group with an error-containing header field (HEADER). For certain data sources this delay should be avoided. Thus these data sources should be transmitted in separate multiplex fields which are not defined by the header field, HEADER.

"Forward signaling" is also another possible use for the header control field, HEX. How often the actual header field, HEADER, is used in the other data blocks is determined in the transmitter. This count can be determined from the actual buffer state of the data sources, statistical considerations or other strategies. After determination of the current header fields with an associated count in the header control field HEX error-containing data groups in the receiver can be corrected in case they are found to be in the value range located in the header control field HEX. In the receiver then the correct header field for the error-containing data block can be immediately and directly determined. This results in no delay. The further in advance that the header field contents can be determined, the better the process works.

The following counting method is given as an example: first it is determined how often the actual header field HEADER appears or is used uninterruptedly in the following multiplex packets or data groups. This value m can, e.g., be determined from the buffer state of the data source (alternatively an arbitrarily chosen count is conceivable). The m is assigned to the count in the header control field, HEX. If m goes beyond the value range of the count, the count is set to a maximum value of $2^z-1$. A change of the header field is possible after at least $2^z$ data blocks or packets. Should a header field change take place, the count is decremented in each packet or data block until the count reaches 0. In the following packet or data block the header field may be changed. The count is now reset or set anew to m and/or $2^z-1$. The value of m is eventually newly determined.

It is significant and also possible to combine both the rearward detection and forward signaling methods as needed. The use of the count in the header control field, HEX, is possible both with variable and also with constant multiplex length.

In another embodiment an especially reliable determination of the state of the header fields in each data block or packet is possible by coordination between the transmitter and receiver. The header control field, HEX, includes two bits (B1 and B2). The bit B1 is set to signal a header field change while the bit B2 is set to signal "answer to a desired header field change signal from the receiver side". In the following a possible scheme for use of the bits B1 and B2 is described:

At the start both bits are set to 0. Next based on that the header field does not change. If the transmitter would like a new header field the bit B1 is set to 1. The receiver detects this in an error-free transmission of the desired change and sets the bit B2 to 1. As soon as the transmitter contains these signals, the header field, HEADER, can be changed. When the answer does not arrive because of a transmission failure, the transmitter retransmits the signal for a desired change in the header field after a predetermined waiting time interval. The transmitter does not change the header field before it detects that B2=1. The receiver then sets B2 to 1, when it immediately receives B1=1. In other cases then B2 is set equal to 0. For the resetting of B1 to 0, the following possibilities are conceivable:

B1 is again set equal to 0 after the header field change signaling. A resetting of B1 to 1 may occur first, when the answer B2=1 is received, or when a minimum time interval expires since the header field change signaling event. B1 is set to 1 until the return signal B2=1 is received.

For both methods it is convenient to determine the running time which is necessary in order to provide a multiplex packet for reception and the reverse. With this knowledge the data packet or data block in which the data change should be performed can be determined in the receiver, in the event that the answer signal B2 would be received error-free by the transmitter.

For all embodiments it is possible to use error-protection methods. Thus the header control field, HEX, can be protected with the aid of an error-detecting and subsequently an error-correcting code. It is of course also possible to regard the header field HEADER and the header control field HEX as a data block which contains a common error protection.

If one would like to make a packet-overlapping distribution of the header fields, HEADER, (Interleaving), it is presupposed that the header field may only be changed after m packets (m packets following each other successively with identical header fields corresponding to a "group"). With the establishment of a number of multiplex packets with constant header field, it is possible to distribute the header field over the enter group. In order to avoid delay at the receiver it is significant that the header field in a transmitted data block within a group contain the multiplex scheme of the following group. At the beginning of the transmission of the data an empty group without information must be first transmitted to provide the header field for the following group which does contain information.

For the protection of the header fields (HEADER) distributed over the m data blocks, different error correction methods are possible, e.g., with the help of Reed-Solomon Codes. According to the Reed-Solomon Coding one obtains $2^k-1$ symbols, which are made up of k bits. The distribution of the header fields, HEADER, along with the error protection along the m packets should occur symbolically. Should more symbols be present then packets, it is convenient to place a larger number of symbols in the front portion of the group. So that reception among other things is possible a decoding of the Reed-Solomon codes takes place before all the symbols are known. The packet-overlapping interleaving allows an improved error correctability of the header field, since the effect of bundling errors is reduced.

For all embodiments described all multiplex protocols provided with the header fields, HEADER, profit from the use of the header field to be transmitted at least m-times in succession. In principle the determination of this count m means nothing other than the expansion of the multiplex packet length when a fixed length is used; without that there is a disadvantageous delay.

If in spite of all other error strategies no possiblity exists to determine the header field (HEADER) associated with a packet, the final error-free header field received should be used.

The disclosure of German Patent Application 1 96 14 739.5 of Apr. 15, 1996 is incorporated here by reference. This German Patent Application describes the same invention as described hereinabove and claimed in the claims appended hereinbelow and forms the basis for a claim of priority under 35 U.S.C. 119.

While the invention has been illustrated and described as embodied in an error-robust multiplex process with header control field, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

We claim:

1. A process for data transmission between two stations by means of data blocks assembled in data packets, each of said data blocks having a synchronization pattern field (SYNC), a header field (HEADER) and an information field (INFORMATION) following the header field, wherein the synchronization pattern fields (SYNC) indicate a beginning of the respective data packets and the header field (HEADER) of each of said data blocks contains control characters for processing the information field following the header field, said process comprising the step of providing a header control field (HEX) following the header field (HEADER) in each of the data blocks for reconstruction of the header field when a transmission of the header field contains errors, and providing a number (z) of bits in the header control field (HEX) for encoding information regarding a possible header field change from one data packets to a subsequent data packets.

2. The process as defined in claim 1, wherein the header field change occurs after at least m of said data packets.

3. The process as defined in claim 2, further comprising determining said m in a transmitter provided in one of the stations.

4. The process as defined in claim 2, further comprising providing a control protocol for determining said m.

5. The process as defined in claim 1, wherein the header field change occurs only after exactly m of said data packets.

6. The process as defined in claim 5, further comprising determining said m in a transmitter provided in one of the stations.

7. The process as defined in claim 5, further comprising providing a control protocol for determining said m.

8. The process as defined in claim 1, further comprising providing a count in the header control field (HEX) of a data packet with a predetermined value to indicate said data packet has a changed header field (HEADER).

9. The process as defined in claim 8, wherein said predetermined value is zero.

10. The process as defined in claim 1, further comprising incrementing a count in the header control field (HEX) when the header field change in comparison to the header field in a preceding one of the data packets.

11. The process as defined in claim 1, further comprising decrementing a count in the header control field (HEX) when the header field changes in comparison to the header field in a preceding one of the data packets.

12. The process as defined in claim 1, further comprising arranging a number (m) of the data packets with equal ones of the header fields in a group by control protocol, setting a count in the header control fields (HEX) of said group to the same value and setting said count to zero when said header field changes.

13. The process as defined in claim 1, further comprising arranging a number (m) of the data packets with equal ones of the header fields in a group by control protocol, incrementing a count in the header control fields (HEX) from one of the data packets to another within said group and setting said count to zero when said group changes.

14. The process as defined in claim 13, further comprising distributing the header fields (HEADER) over all data packets of said group and setting up a multiplex scheme for a subsequent group in said header field so distributed.

15. The process as defined in claim 1, further comprising selecting a variable number of the data packets with equal ones of the header fields to be transmitted, setting a count in the header control fields (HEX) of said data packets in said variable number equal to a maximum value and decrementing said count to a predetermined count value to indicate a header field change.

16. The process as defined in claim 15, further comprising providing a number (z) of bits in the header control fields (HEX) for encoding information regarding possible changes of the header field and wherein said maximum value is equal to $2^z-1$.

17. The process as defined in claim 15, wherein said predetermined count value is zero.

18. The process as defined in claim 15, further comprising maintaining said maximum value constant for a predetermined time interval and providing a control protocol for changing said maximum value after said predetermined time interval.

19. The process as defined in claim 1, wherein said header control field (HEX) has two bits, and further comprising setting said two bits to indicate a desired header field change and to indicate an answer when the indication of the desired header field change is received.

20. The process as defined in claim 19, further comprising resetting the bits indicating the desired header field change after receiving the indication of the answer from the receiver.

21. The process as defined in claim 19, further comprising resetting the bits indicating the desired header field change after expiration of a minimum time interval.

22. The process as defined in claim 1, further comprising jointly protecting the header fields (HEADER) and the header control fields (HEX) of the data blocks with an error-detecting and error-correcting code.

23. The process as defined in claim 1, further comprising protecting the header fields of the data blocks with a Reed-Solomon Code.

* * * * *